Aug. 20, 1957 V. J. LUNDELL 2,803,101
ROW CROP FORAGE HARVESTER
Filed Feb. 1, 1954
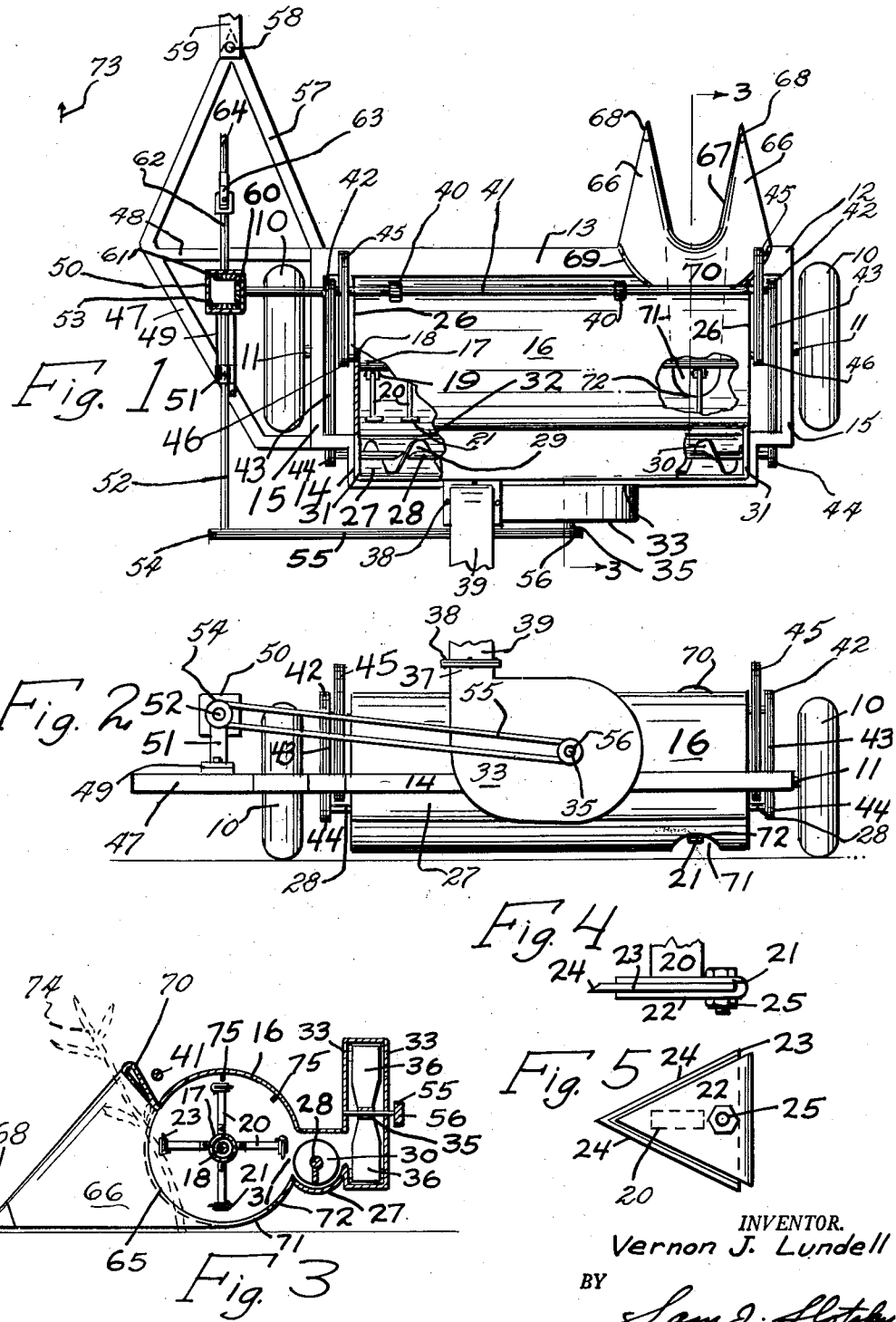
INVENTOR.
Vernon J. Lundell
BY
*Sam J. Slotky*
ATTORNEY

United States Patent Office 2,803,101
Patented Aug. 20, 1957

2,803,101

ROW CROP FORAGE HARVESTER

Vernon J. Lundell, Cherokee, Iowa

Application February 1, 1954, Serial No. 407,393

1 Claim. (Cl. 56—16)

My invention relates to a hay chopper which also includes the combination of an ensilage and corn cutter.

An object of my invention is to provide a device which will gather hay from the field, and whereby the same device will also chop the hay for the necessary feed or other purposes, and to also provide a device which includes an attachable arrangement whereby the device can travel along corn rows and chop up the corn stalks, etc.

A further object of my invention is to provide a cutting or chopping arrangement wherein the ordinary triangular sickle blades can be used in the device.

A further object of my invention is to provide a device whereby when traveling along corn rows, the stalks will be carried directly into the chopping arrangement of the device and thence concentrated into a cylinder and thence transferred into a conveyor member.

A further object of my invention is to provide such a device wherein the material is efficiently chopped up and thence conveyed to the conveyor member, the material thence being blown from the conveyor member into any desired receptacle such as a wagon or the like.

A further object of my invention is to provide a device which can be drawn by and powered from a tractor.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the device, with a portion thereof being taken in section, and with parts broken away and portions taken in section, Figure 2 is a rear view of the device, Figure 3 is a sectional view of Figure 1 taken substantially along the lines of 3—3 thereof, with the wheel being omitted, Figure 4 is a fragmentary side elevational view of a hammer, and Figure 5 is a bottom view of Figure 4.

My invention contemplates the provision of a combination ensilage and corn cutter and hay chopper, which provides an important advantage wherein the same cutter or cylinder used to chop the hay and the like, also gathers this material and conveys it to the desired receptacle or location, with the device also including further means whereby it can be readily converted for passing along corn rows and concentrating and gathering the stalks of corn so that they can be chopped and conveyed by the same arrangement.

I have used the character 10 to designate a pair of side wheels which are journaled at 11 onto a rectangular frame 12, the frame having the portions 13, 14 and side portions 15. Suitably secured to the frame is a cylindrical casing 16 in which is journaled a drum 17 driven by a shaft 18, and pivotally attached at the ears 19 are a series of hammers 20. Attached at the outer ends of each of the hammers 20 are the triangular-shaped members 21 which continue into the further triangular portions 22 parallel thereto, these portions 21 and 22 thereby providing suitable holders whereby the triangular sickle blades 23 of the usual construction and having the edges 24 are securely bolted by means of the through-bolts 25 passing through suitable openings (not shown) in the members 21 and 22 and in the blades 23. Attached to the casing 16 are the end walls 26, and it should be noted that the hammer members 20 are spaced throughout the entire width of the casing 16.

Attached to the casing 16 is a laterally positioned conveyor chute 27 in the ends of which chute is mounted a shaft 28, and attached to the shaft 28 are a pair of helical conveyors 29 and 30, these conveyors being pitched oppositely in order to convey material toward the center of the conveyor, the chute 27 including the end walls 31. The chute 27 terminates at 32 so that material chopped by the blades can be thrown directly into the chute, and attached to the chute 27 is a blower member having the side walls 33, the blower member further including the shaft 35 and radially positioned blades 36. The blower member is positioned adjacently to the chute and communicates directly to the same.

The walls 33 extend into the neck portion 37 to which is attached at 38 a lengthened spout 39 which can extend upwardly a substantial distance, and which also can extend outwardly where it will terminate in a discharge opening (not shown) for discharging the material to a wagon (not shown) or the like, it being understood that the spout can be of any construction.

Attached to the cylindrical casing 16 are the bearings 40 in which bearings is journaled a transverse shaft 41, the shaft 41 being attached to the multiple pulleys at 42 over which pulleys travel the belts 43, these belts 43 passing over further pulleys 44, which pulleys 44 are attached to the shaft 28 and are adapted to thereby drive this shaft 28.

Also attached to the shaft 41 are the larger pulleys 45 which drive the further pulleys 46, which pulleys 46 are attached to the shaft 18, thereby serving to rotate the shaft 18 and the hammers 20.

Secured to the framework portion 15 are the further members 47 and 48 to which is attached the support strap 49 upon which strap is mounted the transmission casing 50. A bearing member 51 is supported from the strap 49, and passing through the bearing member 51 is a shaft 52 which is secured to a bevel gear 53 inside of the casing 50, the other end of the shaft 52 being attached to the pulleys 54 over which pulleys pass the belts 55, which belts 55 pass over further pulleys 56 which are attached to the shaft 35 of the blower member.

Secured to the framework member 48 are the converging further members 57 which are hitched at 58 to a suitable draw-bar 59, the draw-bar 59 being attached to the drawing tractor (not shown) which is adapted to draw the entire arrangement.

The shaft 41 is attached to a further bevel gear 60 which meshes with the bevel gear 61 which bevel gear 61 is attached to the shaft 62, which shaft 62 is secured to the universal joint 63 which joint 63 is attached to the shaft 64, which is suitably engaged with the rear power take-off shaft (not shown) of the tractor, this arrangement thereby serving to drive all of the various elements such as the shafts 41 and 28, the blower member, the rotating hammer members 20, and etc.

Communicating with the cylindrical casing 16 is an opening 65 (see Figure 3), and extending at either side of the opening 65 are the side aprons 66 of a corn stalk concentrating member which is indicated generally by the character 67 and which includes the points 68, attaching flange 69 and the upper inclined wall 70. The cylindrical member 16 also includes an opening at 71 which is of limited width and which is in direct alinement with the space between the aprons 66, this opening terminating at 72, this opening communicating to the bottom of casing 16 as shown in Figure 3, it being noted that from this construction any material passing between the aprons 66 will pass directly into the cylindrical member 16. As the device is pulled forwardly in the direction of the arrow 73 in Figure 1, the hammers 20 will rotate, the blade edges 24 attacking and chopping any material entering into the cylinder 16, this material then being transferred to the portion 27 and augers 29 and 30, which material is then transferred to the blower unit 33 which serves to blow the material upwardly out of the spout element 39, and depositing the material into a wagon or any other desired receptacle.

In Figure 3, stalks of corn are indicated by the dotted lines character 74, and as the device travels forwardly the stalks will be guided between the aprons 66, with the stalks being chopped and removed by means of the rotating blade elements 23 as the machine travels forwardly, so that the stalks will then be chopped, gathered, and will be further chopped as the material passes along within cylindrical casing 16, after which the material is deposited into the conveyor system described above. The opening at 71 permits ample time for the stalks or other material to enter into the casing 16 so that the efficiency of the chopping action at this point is materially increased. Laterally extending baffle plates 75 are attached to the casing in order to provide and assist in the chopping action which takes place within the cylinder.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A chopping machine comprising a transverse cylindrical casing, a transversely positioned shaft mounted in said casing, a plurality of swinging hammers pivotally attached to said shaft, means mounted in said casing for cooperatively chopping crop material with said hammers, cornstalk gathering and concentrating aprons attached to and communicating with said casing and toward one end thereof, said casing having a lower opening of substantially the same width as the distance between said aprons, whereby stalks can communicate from between said aprons into said casing, said cylindrical casing being closed about its complete periphery except for said lower opening, said opening extending rearwardly a substantial distance at the bottom of said casing, conveyor means attached adjacently to said casing to receive the chopped material from said casing.

References Cited in the file of this patent

UNITED STATES PATENTS

| | | |
|---|---|---|
| 2,496,493 | Raney | Feb. 7, 1950 |
| 2,659,188 | Haban | Nov. 17, 1953 |
| 2,663,985 | Hinson | Dec. 29, 1953 |
| 2,677,223 | Schwarz | May 4, 1954 |
| 2,680,337 | Whipple | June 8, 1954 |

FOREIGN PATENTS

| | | |
|---|---|---|
| 18,233/24 | Australia | Mar. 16, 1925 |